July 10, 1956

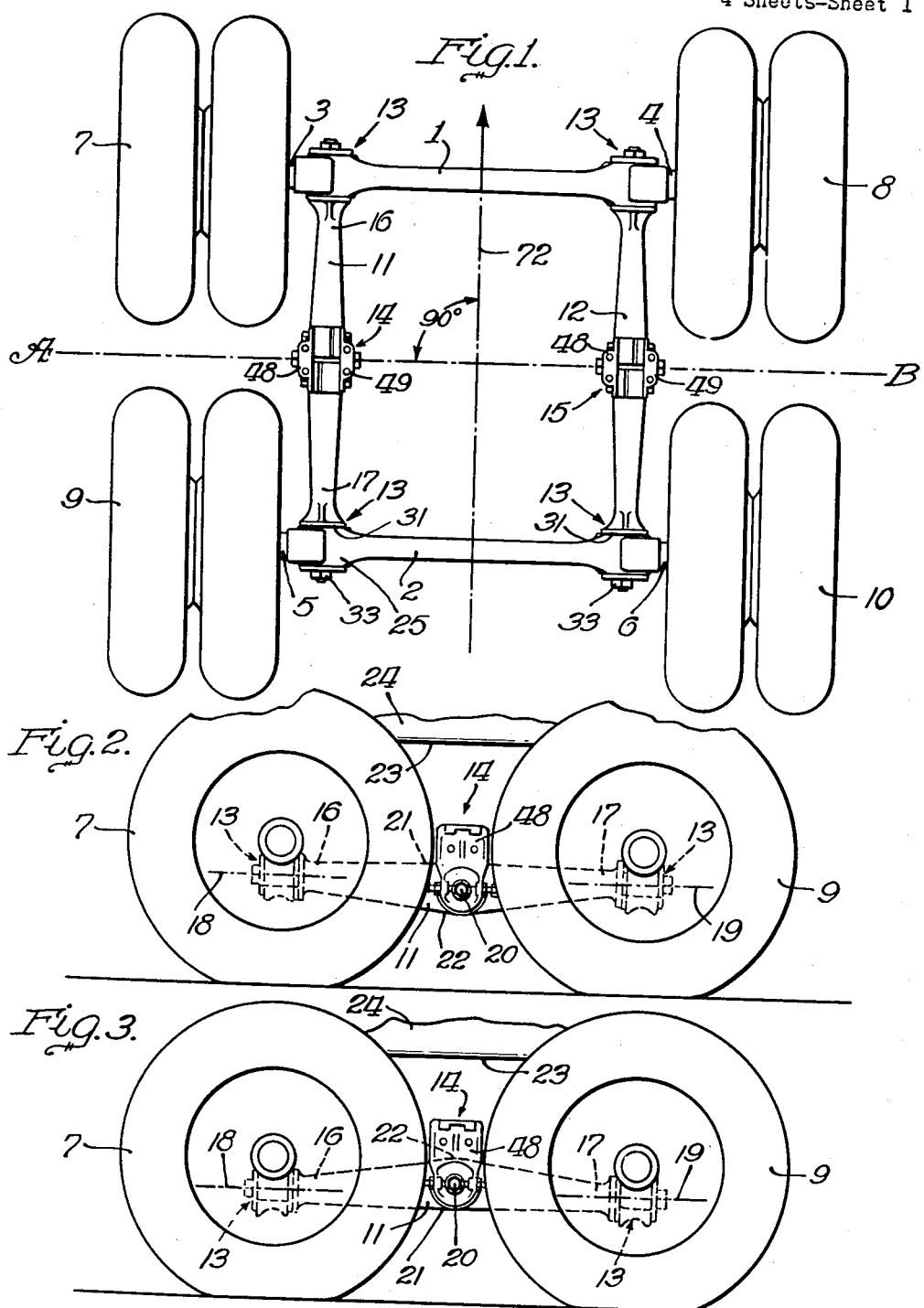

W. E. MARTIN 2,754,132

WALKING BEAM FOR TANDEM AXLES

Filed Jan. 18, 1952

INVENTOR.
William E. Martin
BY
Eberhard E. Welley
Atty.

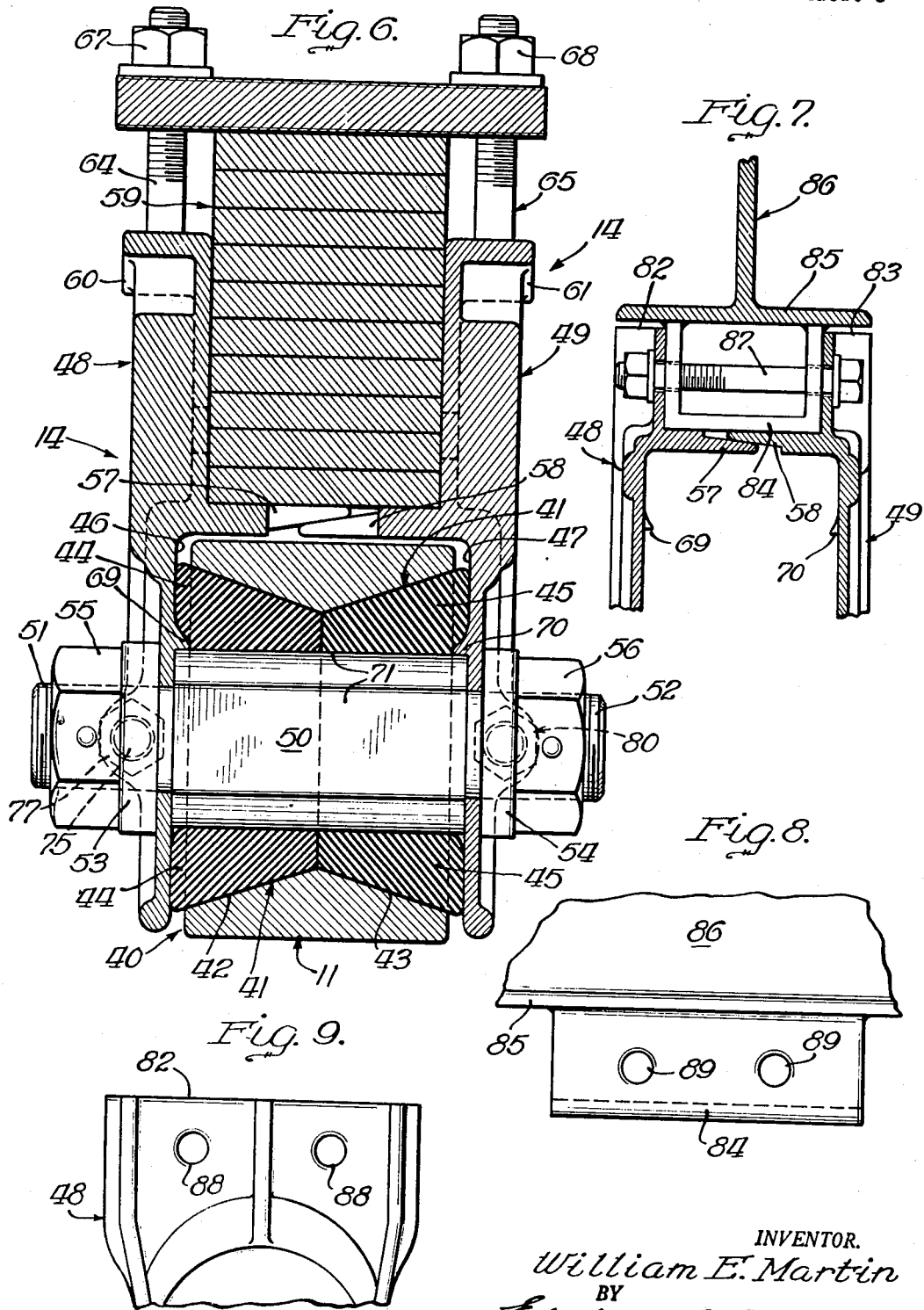

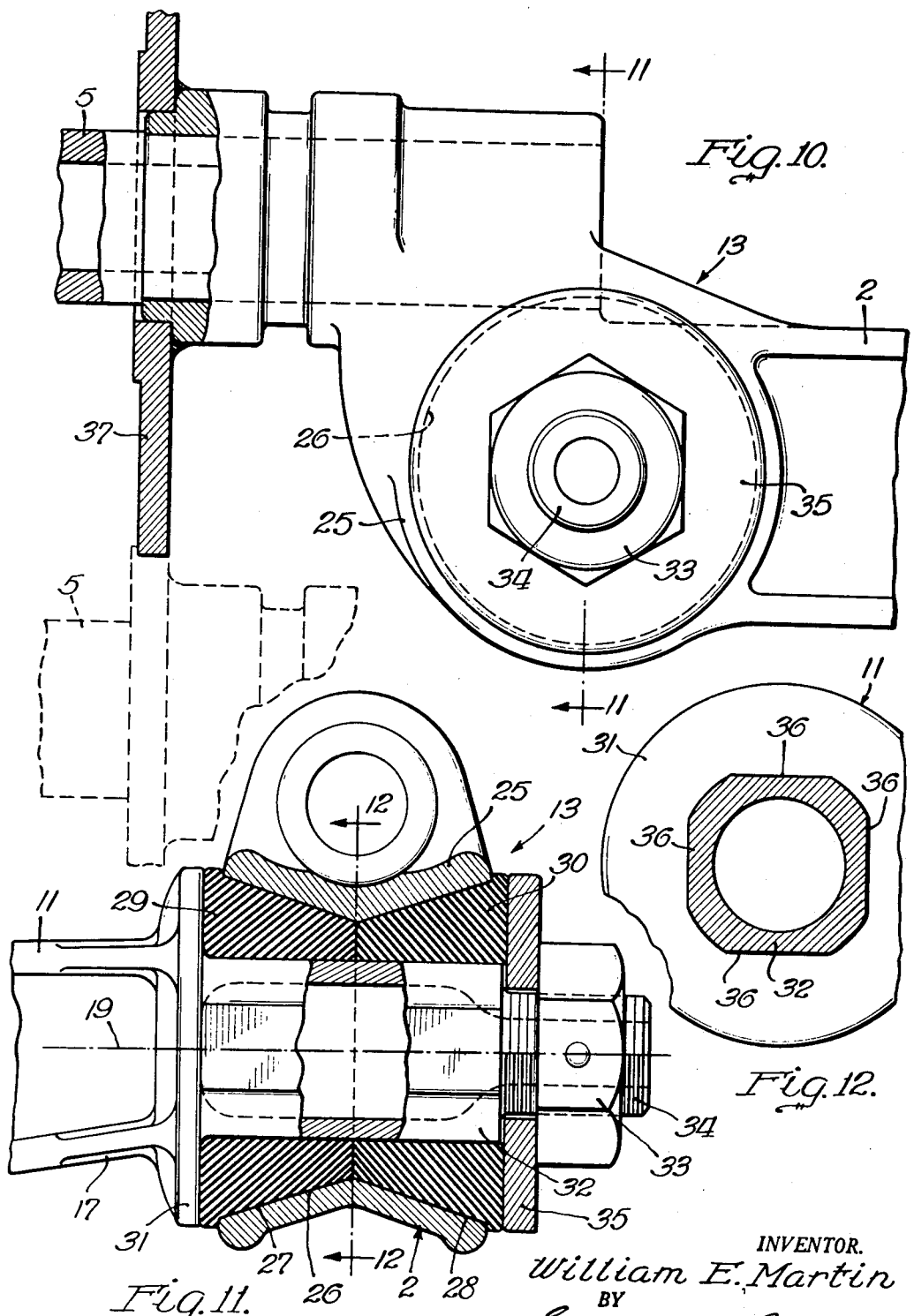

United States Patent Office 2,754,132
Patented July 10, 1956

2,754,132

WALKING BEAM FOR TANDEM AXLES

William E. Martin, Kewanee, Ill.

Application January 18, 1952, Serial No. 267,137

16 Claims. (Cl. 280—104.5)

The invention relates to tandem axle structures and is more specifically directed to the walking beams comprising the fore and aft portions of the running gear framework for tandem axles.

It is one of the main objects of the present invention to provide walking beams that are constructed symmetrically with respect to transverse median planes bisecting the lengths thereof and which are also capable of bodily inversion to dispose portions thereof at different elevations with respect to the connecting vehicle and/or roadway. In this respect, the walking beams are constructed for receiving cooperative bracket mechanisms that are used for joining the tandem axle with a vehicle part.

It is another object of the present invention to provide invertible walking beams wherein the securing mechanism thereof for attaching the axle to a vehicle includes a resilient connection for absorbing road shocks transmitted to the wheeled structure and to counteract transmission of these road shocks to the adjacent attached vehicle part.

It is also another object of this invention to provide walking beams of the character above described which may also be shifted angularly in different lengthwise planes to further accommodate securing the walking beams with the bracket structures to other structural units which may be and comprise a part of the vehicle supported by the axle mechanism.

A still further object of the present invention is to provide a cooperative bracket mechanism connected with each of the walking beams respectively wherein it is possible to adjust the angular positions of the brackets with respect to the walking beam through the interposed resilient structure connecting these parts. By providing such an adjustment, it is possible to completely assemble the framework of the tandem axle including the attaching brackets and in readiness for connecting the axles with a vehicle. By securing the brackets to adjacent vehicle parts, it is possible to shift the brackets relatively to their adjacent walking beams to provide an alignment that will bring the entire running gear into alignment coincident with the direction of travel of the wheels. With the adjustments being possible at both sides of the tandem axle framework, very little actual shifting movement is required under normal conditions to line up the tandem axle so that the wheels travel directly and accurately along the path of movement of the vehicle. This eliminates scuffing and tire wire and also provides a better distribution of the stresses through the tandem axle framework when the latter is aligned as above stated.

Further objects of the present invention include the manner in which the walking beams are connected to the axles as well as being invertible with respect thereto; the reversibility of the walking beams end for end in their connections with the axles as well as the interchangeability of such walking beams one for the other; and also the provision of interchangeable brackets and other parts which together comprise the completed structure forming the framework of the wheeled carriage of this invention.

Other objects and advantages relating to the present invention shall hereinafter appear in the following detailed description having reference to the accompanying drawings forming a part of this specification.

In the drawings:

Fig. 1 is a plan view generally illustrating a tandem axle structure including the walking beams of the present invention and illustrating their bracket arrangements for connecting these beams to a vehicle;

Fig. 2 is a side elevational view of the arrangement illustrated in Fig. 1 showing the walking beams as they appear in Fig. 1;

Fig. 3 is a similar side elevational view as Fig. 2 but illustrating an arrangement wherein the walking beams are inverted to produce a joining connection with a vehicle which is on a different level than that shown in Fig. 2;

Fig. 6 is a vertical transverse cross sectional view of the bracket structure illustrated in Fig. 4 and substantially as seen along the line 6—6 therein;

Fig. 7 is another transverse cross sectional view of the bracket structure with the latter connected with a different form of structural body part of a vehicle;

Fig. 8 is a fragmentary side elevational view of the vehicle part shown in Fig. 7 and to which the bracket structure of Fig. 6 is attached;

Fig. 9 is a fragmentary side elevational view of one of the brackets illustrated in Fig. 6;

Fig. 10 is a fragmentary side elevational view of one of the axle ends to which one of the ends of the walking beam is attached, certain portions having been broken away and in section to illustrate certain details of construction thereof;

Fig. 11 is a vertical cross sectional view taken substantially along the line 11—11 in Fig. 10; and Fig. 12 is a sectional view taken substantially along the line 12—12 in Fig. 11 of the end of the walking beam per se omitting the other parts connected therewith.

Figure 4:
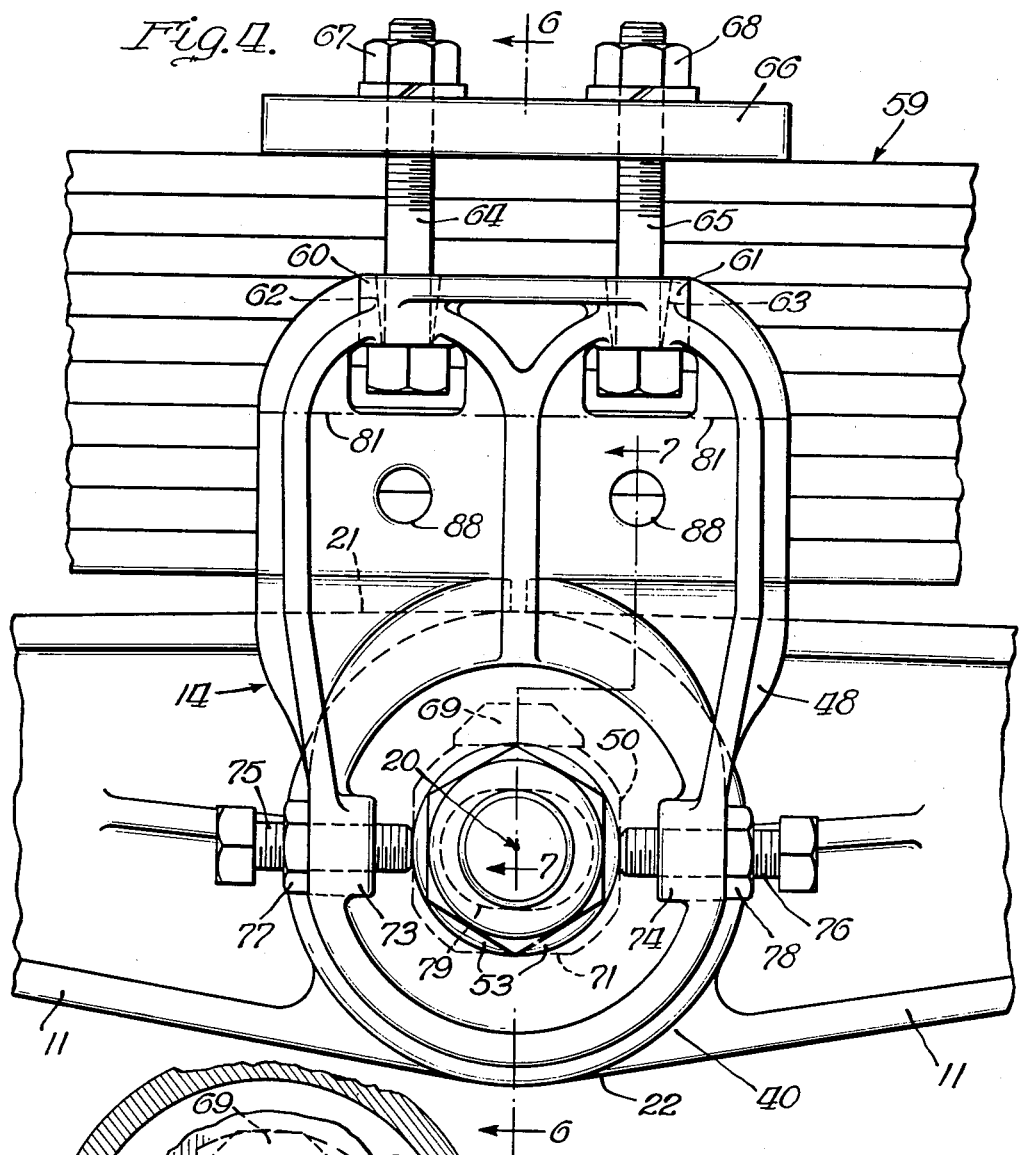
Fig. 4 is a side elevational view on an enlarged scale of a fragmentary portion of the central part of a walking beam and its cooperative bracket structure illustrating the entire unit as secured to a spring of a vehicle.

A general arrangement of tandem axle structure is best illustrated in Figs. 1, 2 and 3 which includes a pair of axles 1 and 2 each having pairs of spindles 3, 4, 5 and 6 at the ends thereof to receive the wheels 7, 8, 9 and 10. The axles 1 and 2 are connected by the walking beams 11 and 12 which comprise the salient elements of the present invention. These walking beams 11 and 12 are symmetrical end to end when considered with respect to a bisecting plane along the axial line A—B, and each is provided with securing union structures such as 13 arranged for resilient connection at spaced points with the axles 1 and 2 respectively.

In addition, each of the walking beams 11 and 12 carries a fastening unit such as 14 and 15 centrally thereof which are identical structures for connecting the walking beams with an adjacent vehicle part. Such connection obviously connects the entire tandem axle structure to a vehicle.

As best seen in Figs. 2 and 3, the walking beam 11 has its end portions 16 and 17 disposed on aligned longitudinal axes 18 and 19 which axes are offset in relation to the axis 20 comprising the central point of connection of the fastening unit or bracket structure 14 with the walking beam 11.

As seen in Fig. 2, the walking beam is arranged with its generally flat portion 21 disposed upwardly and with the generally offset portion 22 of the beam disposed downwardly. In this relationship, the bracket 14 is positioned in a given relation above the aligned longitudinal axes 18 and 19 and also in a given relation with respect to the underside 23 of a portion of the vehicle 24. In the Fig. 3 illustration, the walking beam 11 has been inverted to bring the generally straight portion thereof downwardly with the offset portion 22 disposed toward the vehicle. Also in the Fig. 3 illustration, the bracket structure 14 has been inverted relatively to the walking beam and with this arrangement, the fastening unit or bracket structure 14 now occupies a different relationship with respect to the aligned longitudinal axes 18 and 19 and also with respect to the underside 23 of the vehicle 24.

By referring to Figs. 10, 11 and 12, one of the unions 13 between the walking beams and an axle may best be understood. Fig. 10 shows the axle 2 terminating in a generally circular housing 25 having an aperture 26 formed therein which is formed with oppositely outwardly flared portions such as 27 and 28 to receive bushings 29 and 30 therein as best illustrated in Fig. 11. As seen in Fig. 11, the end 17 of the walking beam 11 is provided with an abutment flange 31 for contact with the extended portion of the resilient bushing 29, and a stub shaft 32 passes through the opening 26 in the ring housing 25 to receive the fastening nut 33 which is threaded upon the threaded end 34 of the stub shaft 32. A disc or washer 35 is carried over the threaded end 34 of the stub shaft 32 and is drawn up against the projecting portion of the bushing 30 by the nut 33, thus locking the entire assembled resilient union 13 with the parts in the cooperative relationships illustrated in Figs. 10 and 11.

Shaft 32 is also made generally polygonally in external contour as illustrated in Fig. 12 to present a number of flat surfaces 36 within the bushings 39 and 30 to prevent relative rotation of the beam 11 about its axis 19 of the stub shaft 32.

The wheel connecting spindle 5 and the associated flange structure 37 form connected parts for joining the wheels such as 9 with the adjacent end of the axle 2, this construction being more fully described and explained in my copending application Serial No. 267,136 filed of even date herewith.

Figure 5:
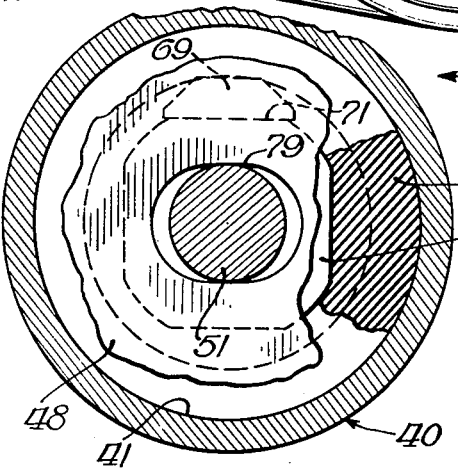
Fig. 5 is a side elevational view of a portion of the attaching structure and walking beam with certain parts thereof broken away and in section to illustrate further details of construction thereof.

Referring now to Figs. 4, 5 and 6, the walking beam 11 centrally supports the fastening unit or bracket structure generally indicated at 14 in these figures. The walking beam 11 is provided with a central socket or ring portion 40 having an aperture 41 therethrough also formed with oppositely outwardly flared portions 42 and 43 for the purpose of confining resilient bushings 44 and 45 therein. Both of the bushings 44 and 45 extend outwardly from the lateral edges of the apertured portion 40 to be engaged by the inner adjacent walls 46 and 47 of a pair of brackets 48 and 49. These brackets straddle the walking beam 11 at the apertured portion 40 thereof and are joined by a shaft 50 which extends through the aperture 41 and through the bushings 44 and 45. Shaft 50 is provided with threaded stud ends 51 and 52 which carry the washers 53 and 54 and upon which stud ends nuts 55 and 56 may be screwed for engaging the washers and for forcing the opposite brackets 48 and 49 together to comforcing press the bushings 44 and 45 therebetween and to expand both of the latter within the opening 41 in the walking beam 11.

With the organization of elements substantially as shown in Fig. 6, the entire bracket structure 14 may be rigidly mounted as shown in fixed relation to the walking beam 11 to provide a means for fastening the walking beam 11 to an adjacent vehicle part. As seen in Fig. 6, each of the brackets is provided with overlapping base portions 57 and 58 to form cooperative means for supporting a suitable vehicle part such as the spring 59 between the brackets and upon the cooperating portions 57 and 58. The latter are more fully described and explained in my copending application Serial No. 95,070, filed May 24, 1949 and which application has now matured into Patent No. 2,650,818, dated September 1, 1953. Each of the brackets is provided with bosses such as 60 and 61 having vertically disposed openings 62 and 63 to receive upright bolts such as 64 and 65 which may be connected to a plate 66 which overlies the spring 59 and which tightly maintains the latter between and upon the bracket parts with the tightening of the nuts 67 and 68.

With this particular arrangement as described, the walking beam 11 is fixedly secured to a vehicle part such as the spring 59 through the resilient construction described in connection with Figs. 4, 5 and 6. It should also be noted as best seen in Figs. 4, 5 and 6, that each bracket is provided with an inwardly disposed lip or lug 69 and 70 respectively which are arranged for engaging a surface portion such as 71 of the shaft 50 which is made of a generally polygonally designed cross section for the purpose of preventing rotation of the shaft 50 relatively to the compressed bushings 44 and 45. The lugs 69 and 70 prevent relative rotation between the brackets and the shaft 50 so that the entire unit for fastening the walking beam 11 to a vehicle part is maintained in the fastened relationship established by tightening the nuts 55 and 56.

In order to prevent wear and tear on the running gear and tires in general, it is necessary that the tandem axle structure be arranged to track and to follow directly along the line of travel indicated by the dot and dash line 72 illustrated in Fig. 1. It is also important that the transverse axial line A—B, which coincides with the respective axes 20 of both of the shafts 50, be maintained at 90° with respect to the line of travel 72 when the tandem axle is secured by means of the fastening structures 14 and 15 to a vehicle. With the present invention it is possible to make the necessary connections between the axle structure and the vehicle as permitted by the designed parts and their respective fastening members and to thereafter be able to make slight adjustments of each of the shafts 50 relatively to their respective bushings and with respect to the attached brackets of each unit. With these adjustments, it is possible to definitely align the entire dual wheel structure for tracking and following the line of travel 72.

This is accomplished as best illustrated in Fig. 4 by providing each of the brackets with aligned bosses 73 and 74 to receive adjusting screws 75 and 76 that may be locked in fixed positions by the lock nuts 77 and 78 with each of the screws 75 and 76 contacting opposite outward peripheral portions of the adjacent washer such as 53 shown in Fig. 4. As shown in Fig. 5, the stub end 51 of a shaft 50 is movable relative to the adjacent bracket 48 within a slot 79 as permitted by the resiliency of the rubber bushings 44 and 45. The same construction is repeated on the opposite bracket 49 having pairs of adjusting units, one of which is indicated in dotted lines at 80 in Fig. 6. With this arrangement, it is possible to shift the ends of either of the shafts 50 bodily in one direction or the other as permitted by the slot 79 in the corresponding adjacent brackets to move the bracket structure relatively to the walking beam 11 to thereby provide a transverse adjustment at each side of the tandem vehicle axle shown in Fig. 1 for aligning the entire axle structure and the wheels to obtain a perfect tracking position to prevent tire wear and wear of the parts that may be subjected to certain unequal stresses because of such unequal tire wear, or through otherwise unadjusted operative running conditions.

Each of the brackets 48 and 49 is also made with other fastening arrangements to connect the walking beams to a vehicle. As shown in Figs. 7, 8 and 9, the brackets 48 and 49 have been cut down in vertical length by severing each of the brackets along a line 81 such as indicated by the dot and dash line in Fig. 4. This provides each of the brackets 48 and 49 with the stub ends 82 and 83 which straddle the opposite sides of a channel member 84 that is welded or otherwise secured to the bottom flange 85 of an I-beam 86 comprising a part of a vehicle. With this construction, bolts such as 87 are inserted through openings 88 in each of the brackets 48 and 49 to provide a transverse or horizontal fastening structure. The channel member 84 is also suitably apertured as best shown in Fig. 8 to provide the openings 89 through which the bolts 87 may be inserted. If desirable, the upper portions of the brackets 48 and 49 need not necessarily be severed, but Figs. 7 to 9 inclusive illustrate the maner in which the overall heights of the brackets might be reduced and still provide fastening parts for connecting a walking beam to a vehicle part.

Certain other changes and modifications in the exact construction and organization of elements described are also contemplated. Such modifications, however, shall be governed by the breadth and scope of the language of the appended claims directed to this invention.

What I claim is:

1. In a tandem wheel carriage for a vehicle, a pair of axles, a pair of walking beams, aligned stub shafts connected with the ends of each beam, releasable fastening means to secure the stub shafts of each beam in given relations with respect to the axles with said beams disposed in predetermined angular positions with respect to a vehicle, and bracket units connected with the intermediate portions of each walking beam to attach each beam to a vehicle, each bracket unit comprising spaced members straddling a beam, said beam having an opening therethrough, a shaft connecting said spaced members through said beam opening, resilient means carried in said beam opening and surrounding said shaft, and cooperative adjustment mechanisms connected with said spaced members and disposed for engagement with said shaft to shift the latter relatively to said beam and within the resilient means in said beam opening.

2. A walking beam for an axle structure comprising a beam having a central opening therethrough and arranged about a transverse axis, said beam having its ends located on aligned longitudinal axes arranged in offset relation with respect to the transverse axis, cooperative fastening means carried in said central beam opening and having vehicle attachment parts to secure the beam to a vehicle, and adjustable means for said cooperative fastening means to shift the latter relatively to said beam and to thereby change the beam relation with respect to its point of attachment with a vehicle.

3. A walking beam for an axle structure comprising a beam having a central opening therethrough and arranged about a transverse axis, said beam having its ends located on aligned longitudinal axes arranged in offset relation with respect to the transverse axis, cooperative fastening means carried in said central beam opening and having vehicle attachment parts to secure the beam to a vehicle, and adjustable means for said cooperative fastening means to shift the latter relatively to said beam and to thereby change the beam relation with respect to its point of attachment with a vehicle, said beam being bodily invertible about said aligned longitudinal axes with said beam ends remaining on said axes, and said cooperative fastening means being arranged for inversion relatively to said beam whereby said fastening means is disposed in a different offset relation with respect to said aligned beam and axes.

4. A walking beam for an axle structure comprising a beam having a central opening therethrough and arranged about a transverse axis, said beam having its ends located on aligned longitudinal axes arranged in offset relation with respect to the transverse axis, cooperative fastening means carried in said central beam opening and having vehicle attachment parts to secure the beam to a vehicle, and adjustable means for said cooperative fastening means to shift the latter relatively to said beam and to thereby change the beam relation with respect to its point of attachment with a vehicle, said beam ends including a resilient union for connection with a wheel axle together with means to counteract bodily rotation of said beam about said longitudinally aligned axes.

5. A walking beam adapted for connection between axles of a dual wheel carriage comprising a beam member having an aperture, and a fastening unit connected with said beam member at said aperture and having parts thereof arranged for connection with a vehicle, said fastening unit comprising spaced brackets flanking said beam member, a shaft joining said brackets and extending through said beam member aperture, resilient bushings in said aperture and surrounding said shaft, and securing means for said brackets to compress said bushings therebetween and to extend the same within said beam member aperture, said shaft having a generally polygonal cross section to counteract relative rotation between said shaft and the bushings frictionally held in said beam member aperture, and said brackets having portions thereof arranged to engage a face of said generally polygonal shaft to counteract relative rotation between said brackets and shaft.

6. A walking beam adapted for connection between axles of a dual wheel carriage comprising a beam member having an aperture, and a fastening unit connected with said beam member at said aperture and having parts thereof arranged for connection with a vehicle, said fastening unit comprising spaced brackets flanking said beam member, a shaft joining said brackets and extending through said beam member aperture, resilient bushings in said aperture and surrounding said shaft, and securing means for said brackets to compress said bushings therebetween and to expand the same within said beam member aperture, said shaft having a generally polygonal cross section to counteract relative rotation between said shaft and the bushings frictionally held in said beam member aperture, and said brackets having portions thereof arranged to engage a face of said generally polygonal shaft to counteract relative rotation between said brackets and shaft, and said brackets providing spaced elements to receive a vehicle part therebetween and having vertically and horizontally arranged openings therein to accommodate vertical and/or horizontally disposed bolt means for securement with a vehicle part.

7. A walking beam adapted for connection between axles of a dual wheel carriage comprising a beam member having an aperture, and a fastening unit connected with said beam member at said aperture and having parts thereof arranged for connection with a vehicle, said fastening unit comprising spaced brackets flanking said beam member, a shaft joining said brackets and extending through said beam member aperture, resilient bushings in said aperture and surrounding said shaft, and securing means for said brackets to compress said bushings therebetween and to expand the same within said beam member aperture, said brackets having slots therein for said shaft, and adjustment members carried by said brackets to engage the shaft adjacent said slots and to shift said shaft relatively to said brackets and within said resilient bushings carried in the aperture of said beam member.

8. A walking beam adapted for connection between axles of a dual wheel carriage comprising a beam member having an aperture, and a fastening unit connected with said beam member at said aperture and having parts thereof arranged for connection with a vehicle, said fastening unit comprising spaced brackets flanking said beam member, a shaft joining said brackets and extending through said beam member aperture, resilient bushings in said aperture and surrounding said shaft, and securing means for said brackets to compress said bushings therebetween and to expand the same within said beam member aperture, said brackets having slots therein for said shaft, and adjustment members carried by said brackets to engage the shaft adjacent said slots and to shift said shaft relatively to said brackets and within said resilient bushings carried in the aperture of said beam member, said adjustment members comprising screw means carried by each of said brackets and adjacent the ends of the slots therein whereby each pair of screw means coact to fix the adjacent shaft end in any adjusted position.

9. In a tandem wheel unit for a vehicle comprising spaced wheel axles, walking beams extending between said axles, and securing means attached to each beam to connect said walking beams with the vehicle, said axles each having socket structures disposed for alignment between said axles, said walking beams each having end shafts for disposition within aligned axle sockets and arranged for rotational adjustment in said sockets, and said securing means each comprising a bracket unit connected by detachable means to a given point intermediate the height of one of said walking beams, and said walking beams each being bodily invertible relative to the axles and with respect to said bracket units through the instrumentality of said detachable means, said point on each of said walking beams being vertically offset in relation to the walking beam end shafts whereby adjusted rotation of said beams through said shafts varies the elevation of said bracket unit point of connection on said beam with respect to the elevations of said wheel axles, and releasable fastening means associated with each axle socket and beam shaft joint to secure said connected members of the joint into fixed positions with respect to each other, said fastening means comprising resilient bushings interposed between the axle socket and said beam shafts together with bushing compressing means to expand said bushings into frictional holding coaction with each of the associated connected parts.

10. In a tandem wheel unit for a vehicle comprising spaced wheel axles, walking beams extending between said axles, and securing means attached to each beam to connect said walking beams with the vehicle, said axles each having socket structures disposed for alignment between said axles, said walking beams each having end shafts for disposition within aligned axle sockets and arranged for rotational adjustment in said sockets, and said securing means each comprising a bracket unit connected by detachable means to a given point intermediate the height of one of said walking beams, and said walking beams each being bodily invertible relative to the axles and with respect to said bracket units through the instrumentality of said detachable means, said point on each of said walking beams being vertically offset in relation to the walking beam end shafts whereby adjusted rotation of said beams through said shafts varies the elevation of said bracket unit point of connection on said beam with respect to the elevations of said wheel axles, and releasable fastening means associated with each axle socket and beam shaft joint to secure said connected members of the joint into fixed positions with respect to each other, said fastening means comprising annular bushings on said beam shafts and having oppositely tapered circumferences, said associated socket having internally tapered portions to match said bushing contours, and coacting compression means carried upon said beam shafts for endwise engaging said bushings to expand said bushings into frictional gripping engagement within said socket and with the beam shaft disposed therein.

11. In a tandem wheel unit for a vehicle comprising spaced wheel axles, walking beams extending between said axles, and securing means attached to each beam to connect said walking beams with the vehicle, said axles each having socket structures disposed for alignment between said axles, said walking beams each having end shafts for disposition within aligned axle sockets and arranged for rotational adjustment in said sockets, and said securing means each comprising a bracket unit connected by detachable means to a given point intermediate the height of one of said walking beams, and said walking beams each being bodily invertible relative to the axles and with respect to said bracket units through the instrumentality of said detachable means, said point on each of said walking beams being vertically offset in relation to the walking beam end shafts whereby adjusted rotation of said beams through said shafts varies the elevation of said bracket unit point of connection on said beam with respect to the elevations of said wheel axles, and releasable fastening means associated with each axle socket and beam shaft joint to secure said connected members of the joint into fixed positions with respect to each other, said fastening means comprising resilient bushings interposed between the axle socket and said beam shafts together with bushing compressing means to expand said bushings into frictional holding coaction with each of the associated connected parts, and said beam shafts having a polygonal external surface contour, and said bushings having apertures therein shaped to fit said shaft and to counteract relative movement between said bushings and the shaft.

12. In a tandem wheel unit for a vehicle comprising spaced wheel axles, walking beams extending between said axles, and securing means attached to each beam to connect said walking beams with the vehicle, said axles each having socket structures disposed for alignment between said axles, said walking beams each having end shafts for disposition within aligned axle sockets and arranged for rotational adjustment in said sockets, and said securing means each comprising a bracket unit connected by detachable means to a given point intermediate the height of one of said walking beams, and said walking beams each being bodily invertible relative to the axles and with respect to said bracket units through the instrumentality of said detachable means, said point on each of said walking beams being vertically offset in relation to the walking beam end shafts whereby adjusted rotation of said beams through said shafts varies the elevation of said bracket unit point of connection on said beam with respect to the elevations of said wheel axles, and releasable fastening means associated with each axle socket and beam shaft joint to secure said connected members of the joint into fixed positions with respect to each other, said fastening means comprising annular bushings on said beam shafts and having oppositely tapered circumferences, said associated socket having internally tapered portions to match said bushing contours, and coacting compression means carried upon said beam shafts for endwise engaging said bushings to expand said bushings into frictional gripping engagement within said socket and with the beam shaft disposed therein, said coacting compression means comprising a first abutment element carried upon said beam, a second abutment element carried upon said beam shaft, at least one of said elements being movable with respect to the other thereof, and adjustable securing means to actuate one of said elements relatively to the other element and in relation to said bushings.

13. In a tandem wheel carriage to provide the running gear of a vehicle, a pair of wheel axles, and spaced walking beams connecting said axles, said walking beams each comprising a beam unit, a bracket unit to connect the beam unit with a vehicle, resilient securing mechanism connecting said units, and adjustable means on one of said units and cooperating with the other of said units to shift one unit with respect to the other unit through said resilient securing mechanism to adjust the position of either of said beam units with respect to the vehicle thereby positioning said connected wheel axles to establish true tracking relation of the running gear wheels in relation to said vehicle travel.

14. In a tandem wheel carriage to provide the running gear of a vehicle, a pair of wheel axles, spaced walking beams connecting said axles, bracket structures fixedly carried on said vehicle and each being adapted for connection with one of said walking beams respectively, and a resilient attaching mechanism connecting said beams with said bracket structures, and adjustable wheel aligning means connected with each of said resilient attaching mechanisms constructed and arranged to shift said beams in relation to said bracket structures to adjust the positions of said wheel axles for aligning the running gear wheels into true tracking relation with respect to said vehicle travel.

15. In a tandem wheel carriage to provide the running gear of a vehicle, a pair of wheel axles, and spaced walking beams connecting said axles, said walking beams each comprising a beam unit, a bracket unit to connect the beam unit with a vehicle, resilient securing mechanism connecting said units, and adjustable means on one of said units and cooperating with the other of said units to shift one unit with respect to the other unit through said resilient securing mechanism to adjust the position of either of said beam units with respect to the vehicle thereby positioning said connected wheel axles to establish true tracking relation of the running gear wheels in relation to said vehicle travel, and flexible joints interposed between the walking beams and said connected axles whereby said axles and beams are angularly shiftable with respect to each other under the operation of said adjustable means.

16. In a tandem wheel carriage to provide the running gear of a vehicle, a pair of wheel axles, spaced walking beams connecting said axles, bracket structures fixedly carried on said vehicle and each being adapted for connection with one of said walking beams respectively, and a resilient attaching mechanism connecting said beams with said bracket structures, and adjustable wheel aligning means connected with each of said resilient attaching mechanisms constructed and arranged to shift said beams in relation to said bracket structures to adjust the positions of said wheel axles for aligning the running gear wheels into true tracking relation with respect to said vehicle travel, and flexible joints interposed between the walking beams and said connected axles whereby said axles and beams are angularly shiftable with respect to each other under the operation of said adjustable wheel aligning means.

References Cited in the file of this patent

UNITED STATES PATENTS

| | | |
|---|---|---|
| 1,739,450 | Fageol | Dec. 10, 1929 |
| 1,925,536 | Judd | Sept. 5, 1933 |
| 2,456,719 | Martin | Dec. 21, 1948 |
| 2,488,002 | Carraher | Nov. 15, 1949 |
| 2,596,390 | Essick | May 13, 1952 |
| 2,641,481 | Chaplin | June 9, 1953 |